G. W. Simonds,
Axe Handle.

No. 56,281.   Patented July 10, 1866.

Witnesses:
Samuel N. Piper.
George Andrews.

Inventor:
G. W. Simonds.
by his Attorney.
R. U. Edel.

UNITED STATES PATENT OFFICE.

GEORGE W. SIMONDS, OF LYNNFIELD CENTRE, MASSACHUSETTS.

IMPROVEMENT IN MODE OF SECURING AXES ON THEIR HANDLES.

Specification forming part of Letters Patent No. 56,281, dated July 10, 1866.

*To all whom it may concern:*

Be it known that I, GEORGE W. SIMONDS, of Lynnfield Centre, of the county of Essex and State of Massachusetts, have made a new and useful Improvement in Ax Helves or Handles; and I do hereby declare the same to be fully described in the following specification and represented in the accompanying drawings, of which—

Figure 1:
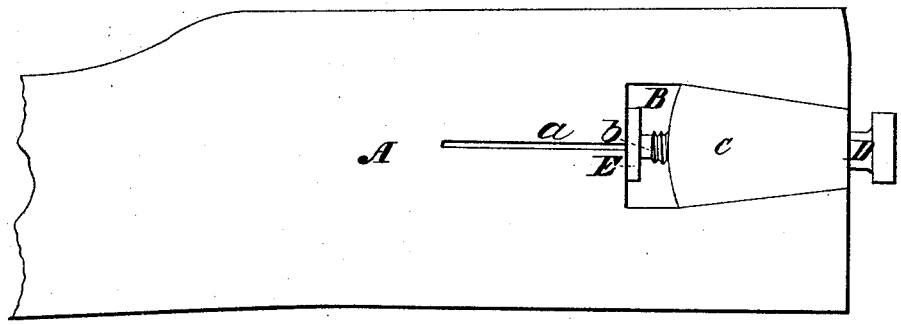
Figure 2:
Figure 3:
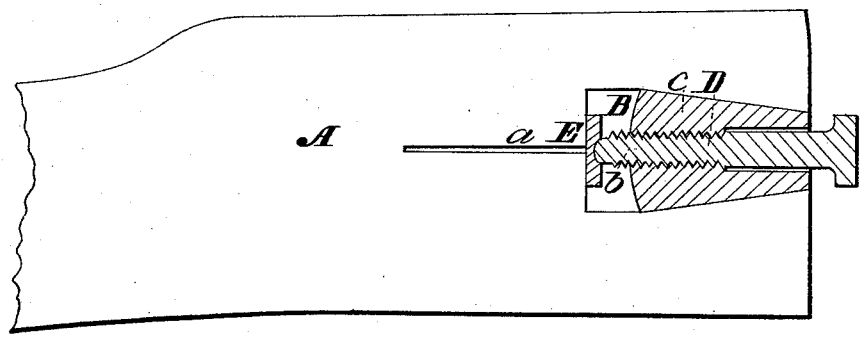

Figure 1 is a side view, Fig. 2 an upper-end view, and Fig. 3 a vertical section, of an ax-helve provided with my invention, the purpose of which is to fasten the helve in the eye or socket of an ax.

In the said drawings, A denotes the ax-helve as made with a tapering chamber or recess, B, formed in its upper part, and also with an opening at top and a saw kerf or slit, *a*, leading down from such chamber in manner as represented. Within the tapering chamber is a wedge-shaped expander, C, down through the middle of which a screw, D, is screwed. The foot *b* of the screw is pivoted into a step or piece of metal, E, resting on the bottom of the chamber or recess B. By turning the screw D the expander C may be moved against the sides of the chamber, so as to expand the head of the helve, and thus when the helve is within the eye of the ax the part in such eye may be expanded so as to cause it to fit closely into the eye. By reversing the motion of the screw so as to raise it off the step E, the expander C may be forced downward by pressure or one or more blows directed upon the head of the screw. The head of the helve will then be enabled to contract by its inherent elastic force, and so as to enable the helve to be withdrawn from the ax.

By making the saw-kerf in the helve it is rendered capable of being more readily expanded than it would be without the said kerf.

What I claim is—

The combination of the expander C, the screw D, and the step E, applied to the tapering chamber B of the ax-helve, the whole being arranged and so as to operate substantially as specified.

GEO. W. SIMONDS.

Witnesses:
R. H. EDDY,
G. H. WASHBURN.